(12) United States Patent
Kaplan (10) Patent No.: US 9,235,100 B1
(45) Date of Patent: *Jan. 12, 2016

(54) APPARATUS FOR DUAL-POLARIZATION QAM AND OPTICAL COMMUNICATIONS SYSTEM USING THE SAME CROSS-REFERENCE TO RELATED APPLICATION

(75) Inventor: Arkady Kaplan, Rockville, MD (US)

(73) Assignee: Celight, Silver Spring, MD (US)

( * ) Notice: Subject to any disclaimer, the term of this patent is extended or adjusted under 35 U.S.C. 154(b) by 735 days.

This patent is subject to a terminal disclaimer.

(21) Appl. No.: 13/602,282

(22) Filed: Sep. 3, 2012

Related U.S. Application Data (63) Continuation-in-part of application No. 13/413,161, filed on Mar. 6, 2012, and a continuation-in-part of application No. 11/679,376, filed on Feb. 27, 2007, now Pat. No. 8,050,351, and a continuation-in-part of application No. 11/695,920, filed on Apr. 3, 2007, now Pat. No. 7,715,720, and a continuation-in-part of application No. 12/045,765, filed on Mar. 11, 2008, now Pat. No. 8,064,767.

(51) Int. Cl.
| | |
|---|---|
| H04B 10/50 | (2013.01) |
| H04B 10/556 | (2013.01) |
| G02F 1/225 | (2006.01) |
| H04B 10/2543 | (2013.01) |
| H04B 10/508 | (2013.01) |
| H04B 10/532 | (2013.01) |
| H04B 10/54 | (2013.01) |
| H04B 10/60 | (2013.01) |
| H04J 14/00 | (2006.01) |
| H04J 14/02 | (2006.01) |
| H04J 14/08 | (2006.01) |
| H04L 7/00 | (2006.01) |

(52) U.S. Cl.
CPC ............ *G02F 1/225* (2013.01); *H04B 10/2543* (2013.01); *H04B 10/505* (2013.01); *H04B 10/508* (2013.01); *H04B 10/5053* (2013.01); *H04B 10/5057* (2013.01); *H04B 10/50577* (2013.01); *H04B 10/532* (2013.01); *H04B 10/541* (2013.01); *H04B 10/5561* (2013.01); *H04B 10/60* (2013.01); *H04J 14/005* (2013.01); *H04J 14/02* (2013.01); *H04J 14/08* (2013.01); *H04L 7/0075* (2013.01); *G02F 2201/126* (2013.01); *G02F 2203/06* (2013.01)

(58) Field of Classification Search
CPC ............ H04B 10/612–10/614; H04B 10/5053; H04B 10/532; H04B 10/548; H04B 10/556; H04B 10/5561; H04B 398/184; H04B 398/189–398/191; H04B 398/201; H04B 10/541; H04B 10/508; H04B 10/50577; H04B 10/5057; H04B 10/2543
See application file for complete search history.

(56) References Cited

U.S. PATENT DOCUMENTS

| | | | | |
|---|---|---|---|---|
| 8,285,153 | B2 * | 10/2012 | Kaplan et al. | 398/204 |
| 8,412,047 | B2 * | 4/2013 | Tanaka et al. | 398/102 |
| 2014/0356001 | A1 * | 12/2014 | Barton et al. | 398/183 |

* cited by examiner

*Primary Examiner* — Leslie Pascal
(74) *Attorney, Agent, or Firm* — Nadya Reingand (57) ABSTRACT

An integrated optical signal Synthesizer and Analyzer for optical communications, each formed on a single chip, is disclosed. The Synthesizer and Analyzer are both design to use a Dual-Polarization Quadrature Amplitude Modulation (QAM) for communication operating at high data rates. A communication system for data transmission having such synthesizer and the analyzer is also disclosed.

17 Claims, 4 Drawing Sheets

APPARATUS FOR DUAL-POLARIZATION QAM AND OPTICAL COMMUNICATIONS SYSTEM USING THE SAME CROSS-REFERENCE TO RELATED APPLICATION

CROSS-REFERENCE TO RELATED APPLICATION

The present invention is a continuation-in-part of U.S. Ser. No. 13/413,161 filed on Sep. 3, 2012, U.S. Ser. No. 11/679,376 filed on Feb. 27, 2007, U.S. Ser. No. 11,695,920 filed on Apr. 3, 2007, and Ser. No. 12,045,765 filed on Mar. 11, 2008, all of which is fully incorporated herein by reference.

FIELD OF INVENTION

This invention relates generally to optical communications, in particular coherent communication, with Multi-Level Quadrature Amplitude Modulation (M-QAM) format. The present invention discloses a single-ship integrated modulator (Synthesizer) and a single-ship integrated QAM receiver (Analyzer), both capable of dual-polarization performance. These modules are of particular interest in the systems with orthogonal frequency division multiplexed (OFDM) transmission of data. These devices can also be used in coherent modulation scheme (e.g. M-PSK, Star-QAM) with a key-based multi-dimensional real-time hopping in frequency and/or polarization state.

BACKGROUND OF THE INVENTION

The effective extension of the communication distance and the data capacity in the next-generation optical signal technology is no longer a theoretical possibility, becoming the feasible solutions for the modern optical network. This is due, mainly, to the combination of several critical technological advancements, such as, 1) coherent optical detection development, 2) QAM format adoption, 3) progress in adaptive electrical equalization technology.

Figure 1:
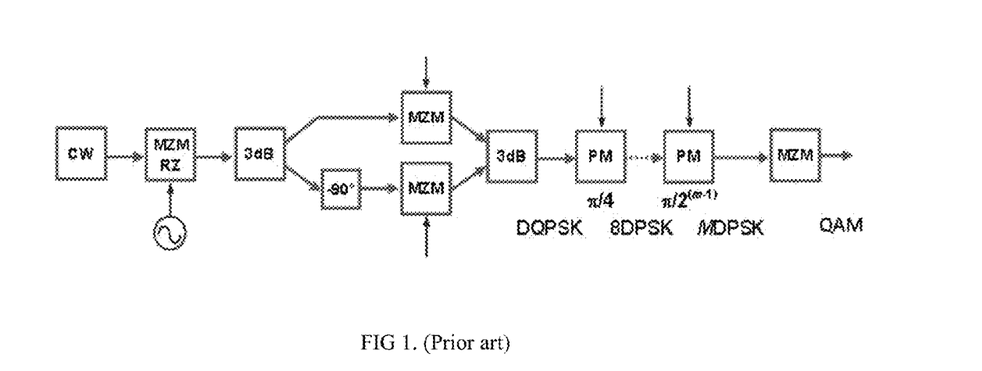
FIG. 1, the prior art, shows a schematic of an optical part of a high-order PSK/DPSK/QAM transmitter composed of an optical IQ modulator and consecutive PMs and MZM.

A typical single-polarization transmitter configuration suitable for generating arbitrary PSK/DPSK signals, which has recently been employed with high-order phase modulation, uses binary electrical driving signals and is composed of a combination of an optical IQ modulator and consecutive phase modulators, as depicted in FIG. 1. The optical IQ modulator, whose Mach-Zehnder modulators (MZMs) are driven at the minimum transmission point, accomplishes a quaternary phase modulation, and higher-order phase modulation signals are generated by the consecutive phase-modulators (PMs). Such PSK/DPSK transmitters are extended by an additional intensity MZM at the end, see FIG. 1, for a Star-QAM generation with symbols placing at the different intensity levels.

The high-speed wide-bandwidth Lithium Niobate (LN) modulators are typically based on either an X-cut (Y-propagating) or Z-cut MZM with traveling-wave electrodes. The single-mode optical waveguides can be fabricated by either Ti-in-diffusion or annealed proton exchange. In a single MZM the refractive index is changed by an externally applied voltage. Such transmitters can be enhanced to polarization multiplexing using polarization-rotators converters that can be built-in into the same LN chip.

On the receiving side a coherent detection is implemented to decode the received optical beam. In contrast to existing optical direct-detection system technology, an optical coherent detection scheme would detect an optical signal's amplitude as well as its phase and polarization. Within the fixed optical bandwidth more data can be transmitted using a coherent detection scheme with increased detection capability and spectral efficiency. Coherent detection provides increased receiver sensitivity by 2-6 dB compared to an incoherent system. In addition, since coherent detection enables an optical signal's phase and polarization to be measured and processed, the transmission impairments that previously presented challenges to accurate data reception can, in principle, be mitigated electronically when an optical signal is converted into the electronic domain. Tier-1 network providers have now realized the potential for optical coherent systems by deploying DPSK systems with improved DSP receiving circuits based on complicated optical phase-lock loops.

Figure 2:
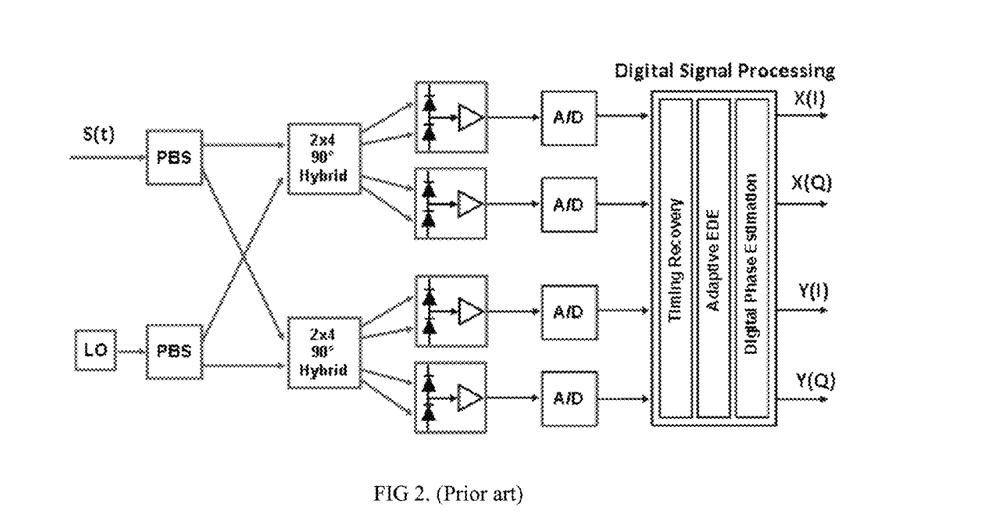
FIG. 2, the prior art, shows a schematic of a digital coherent receiver with homodyne synchronous detection employing adaptive EDE, digital phase estimation and polarization de-multiplexing.

FIG. 2 shows the basic setup of a digital coherent receiver with homodyne synchronous detection and polarization division de-multiplexing.

The signal launched into the receiver is split by a polarization beam splitter (PBS). Than both polarization components are interfered with the LO light in two 2×4 90° hybrids. In practice, both separated polarization components of the information signal at the PBS outputs exhibit the same linear polarization state, and it suffices when the LO light, whose polarization must then be aligned to the polarization of the signal at the two PBS outputs, is equally split with a 3 dB coupler. The carrier synchronization is performed by digital signal processing (DSP). The output signals of the two 2×4 90° hybrids are detected by two pairs of balanced detectors which provide the in-phase and quadrature photocurrents of both polarization components at the outputs of the optical receiver frontend. In the electrical receiver part, the in-phase and quadrature signals are sampled by A/D-converters and then further processed by elaborate digital signal processing.

Arbitrary formats modulation formats can be demodulated by such a receiver since demodulation is based on absolute phases. For the detection of any modulation format, the same optical frontend can be used. The digital algorithms and the data recovery must be adapted in accordance with the particular received format. Receiver sensitivity is also increased in comparison with receivers based on differential detection. Moreover, the availability of the optical phase information in the electrical domain enables an efficient digital equalization to compensate for transmission impairments.

The optical hybrids show in FIG. 2 are the critical part of the coherent receiver needed to combine a local oscillator wave, Lo, with the received signal, S. Such an optical hybrid is a key component in phase- or polarization-diversity schemes. Ideally, the hybrid should combine waves with quadrature relative phases at the outputs, providing the advantage of base-band processing. In a two-phase case outputs must be mutually phased at 90° (in-phase and quadrature, referred to as I and Q signals).

It would be desirable to create highly integrated devices with functionality shown in FIG. 1 and FIG. 2, preferably built-in within the same electro-optical chip, sharing a single package with electronics components.

The goal of this invention is to use coherent transmitters/receivers, and channel compensation algorithms to achieve agile free-space optical communications links. The flexible, highly integrated architecture will provide a secure, robust, multi-rate/multi-format cost-efficient optical transmission that is resistant to jamming and eavesdropping and achieves spectrally-efficient high data rate throughput in any challenging communication environment.

SUMMARY OF THE INVENTION

A highly integrated optical Synthesizer is disclosed to be used for dual-polarization coherent modulation signal generation scheme (e.g. Star-QAM).

The Synthesizer comprises two QPSK modulators and two polarization controller/scramblers, capable of performing a polarization state transformation of the PSK signal by an applied electrical control. Each QPSK modulators provides the modulated data to be transmitted in different state of polarization, i.e. TE or TM, respectively. Each single-polarization modulated signal coming from polarization controllers/scramblers experiences another intensity modulation by output MZMs for QAM generation.

In order to achieve compactness, necessary for integration, the synthesizer includes mirrors located on the front and back surfaces of the chip. The each part of modulated signal (i.e. TE or TM) experiences reflections at the edges of the chip before being combined together at the chip output.

It is another object f the present invention, a highly integrated optical Analyzer is disclosed to be used for dual-polarization coherent modulation signal generation scheme (e.g. Star-QAM).

The Analyzer receives the dual-polarization QAM Signal and a Local Oscillator which is polarized at 45 degrees relatively to the vertical and horizontal axis of the waveguide (TE and TM polarizations). The Signal and Local Oscillator then each split by a Y-branch waveguide. The two independent phase-shifters are applied to the each branch of the splitted Signal, each affecting the TE or TM portion of the beams. Two 3 dB couplers are used afterwards to mix respectful branches of the Signal and Local Oscillator beams. The four polarization splitters are further applied to provide the quadrature signal for each polarization. Furthermore, four pairs of highly integrated balanced photo-receivers provided the real (I) and imaginary (Q) components for each channel (TE or TE polarization) to be digitized Than the balance detectors being then used to recover the transmitted data in both polarizations using four analog-to-digital converters.

The chip for the synthesizer and analyzer are made of a material selected from ferroelectric or semiconductor material. The technology that is used with the electro-optical material is selected from in-diffused metal technology, protonic-exchange optical technology, etching optical technology or milling optical technology.

It is another object of the present invention to provide a system and method for data transmission using the synthesizer and analyzer of the present invention. Such configuration allows improving communication performance for QAM data transmission in two polarization states.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 3:
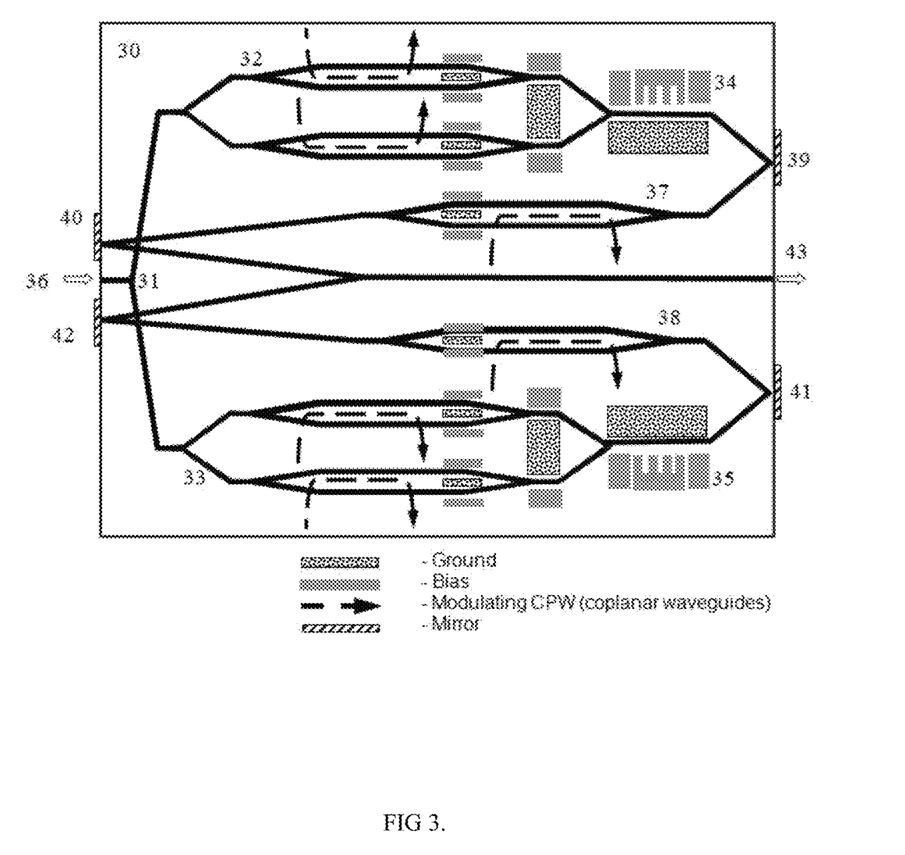
FIG. 3 shows a layout of the highly-integrated dual-polarization Star-QAM Synthesizer based on LiNbO$_3$ wafer.

FIG. 3 shows a schematic of a preferred integrated synthesizer capable of dual-polarization Star-QAM signal generation. The synthesizer 30, two QPSK modulators 32 and 33 and two polarization controller/scramblers 34 and 35. The principle of its operation is as follows. Input optical beam 36 is divided by a splitter 31 into two parts. Each part then fed into corresponded QPSK modulator 32 and 33. Each QPSK modulators 32 or 33 provides the modulated data to be transmitted in different state of polarization, i.e. TE or TM, respectively. For this purpose, the output signals from QPSK modulators 32 and 33 undergo polarization transformation by polarization controllers/scramblers 34 and 35, thus assigning a desirable single state of polarization to each modulated output from 32 and 33.

Furthermore, each single-polarization modulated signal coming from polarization controllers/scramblers 34 and 35 undergo following intensity modulation by MZMs 37 and 38. Each MZM 37 and 38 modulator is dedicated to modulate a single state of polarization, i.e. TE or TM.

Each part of modulated signal (i.e. TE or TM) experiences two successive reflections 39, 40 and 41, 42 at the edges of the chip and combined together at the chip output: Y-branch polarization combiner 43.

Each of the two QPSK modulators 32 and 33 (FIG. 3) is based on two broadband MZ modulators (independently controlled and biased) and one phase-shifter to maintain 90° between encoded in-phase (I) and quadrature-phase (Q) signals. Each branch is phase and/or amplitude modulated using a MZ modulator. The I and Q signals are then recombined into a single waveguide, which is disclosed in more details in U.S. patent application Ser. No. 11/679,376 by the same team of inventors.

A generalized single chip integrated Optical Modulator component 30 exhibits the following key innovations: (i) Multi-level synthesis of complex arbitrary discrete coherent quadrature constellations (M-PSK, M-QAM, QAM) using six D/A converters driving the MZMs; (ii) Integrated orthogonal dual polarization for enhanced spectral efficiency and time-delayed data replication over orthogonal polarizations to mitigate fading and scintillation caused by air turbulence and (iii) Polarization scrambler that combines the optical signal polarization state on any arbitrary point on the Poincaré Sphere.

The synthesizer is capable of modulating an arbitrary PSK or QAM signal onto each polarization (e.g., 2-, 4-, 8-, 16-PSK or 4-, 8-, 16-QAM). For example, assuming a symbol rate of 12.5 GHz in each polarization, a 16-QAM signal will encode 4 bit/symbol, for a bit rate of 50 Gbit/s/polarization. The total bit rate is 100 Gbit/s.

It is virtually very difficult to sequentially combine a splitter, modulators and polarization-converters in a single piece of electro-optical material, because of the limitation in commercially available wafers and manufacturing technology. Due to the high bending losses in many electro-optical materials, the direction of the waveguide propagation cannot be steeply changed. In addition, in electro-optical materials, the desirable propagation direction has to be preserved in order to obtain smaller propagation losses and higher electro-optical effect.

In order to achieve the high level of integration within the same piece of electro-optical material, the mirror-like reflective regions are proposed for Synthesizer integrated device. Schematic diagrams for a novel quadrature transmitter and receiver are shown in FIG. 3 with the use of sets of light-reflective regions (39, 40 and 41, 42).

In the preferred embodiment, the chip substrate is coated with a buffer layer of silicon dioxide. A coplanar-waveguide (CPW) traveling-wave type electrode structure is formed on the buffer layer with thick plated-gold. $SiO_2$ and gold thickness are optimized for velocity matching of the optical and electrical signals. The CPWs are designed for 50 Ohms impedance. The QPSK modulator devices can be optimized for desired electro-optical bandwidth by modification of the buffer layer properties and electrode/waveguide geometry. The working point of the each MZM within the chip is controlled by bias electrodes.

In the preferred embodiment, the velocity matching can be obtained by varying the following design parameters: the width of the center conductor, the gap between the center conductor and grounded electrodes, the thickness of the electrode structures and the buffer layers, as well as the dielectric properties of the buffer layer. The electro-optic bandwidth of a QPSK modulator primarily depends on the phase mismatch between the optical and microwave phase velocities. However, when they are matched and maximum optical bandwidth is achieved, the bandwidth value is limited by the total microwave loss.

In the preferred embodiment, the LN ferroelectric substrate can be used with its relative microwave region dielectric constant being significantly larger than that in the optical region. When velocity matching is achieved with certain parameters the characteristic impedance may be lower than 50 Ohms; this mismatch results in increased RF reflections degrading the electro-optical response, particularly at higher frequencies. Keeping the characteristic impedance near 50 Ohms may require adjusting the electrode structure in ways that result in less overlap between the RF field and the optical waveguide. Both of these issues will affect the switching voltage or $V_\pi$.

In the preferred embodiment, the attenuation of the RF signal is affected by several characteristics of the CPW waveguide. The amount of doping in the buffer influences the RF-attenuation due to varying resistivity and material losses. Larger center conductor widths and thicker electrodes reduce the RF propagation losses. Especially at thin Au thicknesses the electrical attenuation can increase dramatically. For example, the skin depth of Au is about 385 nm at 40 GHz. In the modified buffer structure the dielectric permittivity of the buffer layer can be increased, potentially improving the overlap of the RF field and the optical waveguide and enabling low-voltage and broadband-type performance. The buffer layer has a conductivity that is much lower than that of metals. Modifying the buffer layer by doping may result in a marked increase of the electrical field strength in the region of maximum optical field by increasing the electro-optical interaction. Thus, the doping of the buffer layer potentially allows for a reduction of microwave power consumption with respect to the conventional configuration of various electrode gap spacing (hot-to-ground).

Another element of proposed integrated transmitter is a polarization converter/rotator device (PC) (34 and 35 in FIG. 3). This component is capable of performing a polarization state transformation by applied electrical control. The PC will combine the two QPSK modulator outputs into a single waveguide with orthogonal polarization states. In a single LN substrate, electro-optically adjusted birefringence is not sufficient to achieve effective polarization transformation since mode-conversion between the orthogonal TE and TM components is also required. Efficient 100% electro-optical conversion can be achieved by utilizing an off-diagonal element of the electro-optical tensor to cause mixing between the orthogonal TE and TM modes (normally uncoupled). However, an electro-optical TE↔TM converter alone is also not capable of providing general polarization transformation. In general, our approach is based on the known variable efficiency polarization conversion scheme, where the two different electrical fields are applied alternately along the interaction region.

In the preferred embodiment of a polarization converter/rotator, electrical field applied parallel to the LN crystal X direction to induce an off-diagonal element in the dielectric permittivity tensor via the strong electro-optic coefficient $r_{51}=28\times1012$ m/V. In this approach, a large number of short sections of birefringence tuning electrodes are periodically interleaved between short sections of TE↔TM mode converter electrodes. Although this arrangement may result in longer interaction lengths it clearly permits independent control of TE↔TM mode conversion and birefringence tuning. In such an orientation the TE and TM modes have significantly different propagation constants due to the large birefringence of LN. The propagation constant of the TM mode is mainly determined by the ordinary refractive index of LN, whereas the propagation constant of the TE mode is mainly determined by the extraordinary index.

In preferred embodiment, single chip generalized modulator is fabricated on a 4" LN wafer by titanium in-diffused technology, with waveguides designed for single-mode TEM operation on an X-cut or Z-cut LN crystals.

Moreover, in preferred embodiment the single chip generalized modulator is driven by a MEMs-based narrow linewidth contiguously tunable laser capable of fast hopping.

Furthermore, in preferred embodiment, the single chip generalized modulator is an interferometric device that is adaptively stabilized and recalibrated for each frequency hop of the laser using DSP algorithms to mitigate: (i) I, Q orthogonal mismatch; (ii) I, Q power balancing and (iii) Polarization orthogonality mismatch.

Furthermore, in preferred embodiment, the phase noise caused by vibration can be compensated by adaptive DSP algorithms that control the constellation accordingly.

A thermo-optical effect can be used to control the phase of the optical beams. The thermo-optical controllers of the couplers and/or phase-shifters can be used to complement or replace the electro-optical controllers.

Proposed Synthesizer based the single chip generalized modulator provides an innovative move over the current dedicated 2-bit QPSK modulators that lack these capabilities. Prior art does not disclose an integrated single chip modulator that produces an output beam in two polarization state of the light, where each state of polarization is multi-level PSK modulated. Such beam carries twice more information compared with the standard approach. There is a need to create modulators that help to improve an optical link capacity with advanced reliability and compactness.

A light beam, modulated with data using the synthesizer is transmitted toward a receiver. It can be transmitted via fiber or in a free-space link or in inter-satellite communication.

Figure 4:
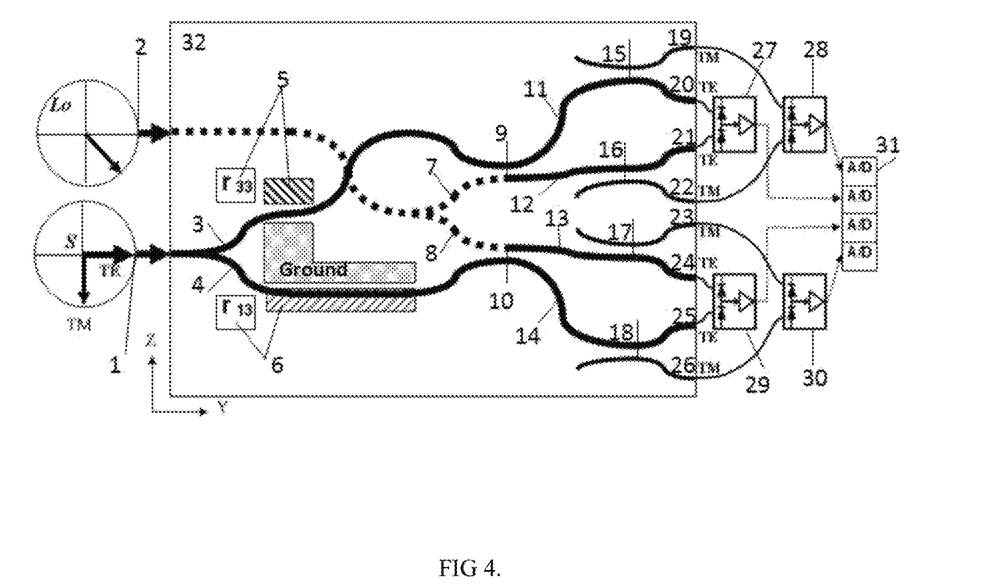
FIG. 4 shows a layout of the highly-integrated dual-polarization Star-QAM Analyzer based on LiNbO$_3$ wafer.

FIG. 4 shows a schematic of a preferred integrated analyzer capable of dual-polarization Star-QAM signal receiving. An analyzer 32 shown in FIG. 4 is the crucial component of the communication system.

Analyzer 32 includes the input 1 for the received dual-polarization Star-QAM Signal and a second Local Oscillator optical input 2 which is polarized at 45 degrees relatively to the TE and TM polarizations of the waveguide (and the Signal). A first splitter divides the input 1 beam into two optical beams 3 and 4; and a second splitter divides the input 2 into two optical beams 7 and 8. Then a first phase-shifter 5, applied to the beam 3, affecting the TE optical mode exclusively while a second phase-shifter 6, applied to the optical beam 4, affecting the TM optical mode exclusively. Then a first 3 dB coupler 9 mixes the optical beams 3 and 7, providing optical beams 11 and eights 12; while a second 3 dB coupler 10, mixes the optical beams 4 and 8 providing optical beams 13 and 14.

Furthermore, the optical beam 11 goes to a first polarization splitter 15, producing the first TE-polarized output 20 and the second TM-polarized output 19. At the same time, the optical beam 12 goes to a first polarization splitter 16, producing the first TE-polarized output 21 and the second TM-polarized output 22. At the same time, the optical beam 13 goes to a first polarization splitter 17, producing the first TE-polarized output 24 and the second TM-polarized output 23. At the same time, the optical beam 14 goes to a first polarization splitter 18, producing the first TE-polarized output 25 and the second TM-polarized output 26.

Four pairs of highly integrated balanced photo-receivers providing the real (I) and imaginary (Q) components for each channel (TE or TE polarization) to be digitized.

A first balance detector 27 detecting the TE-polarized outputs 20 and 21; a second balance detector 28 detecting the TM-polarized outputs 19 and 22; a third balance detector 29 detecting the TE-polarized outputs 24 and 25; and a fourth balance detector 30 detecting the TM-polarized outputs 23 and 26.

Furthermore, the a balance detectors 27 and 29 being then used to recover a transmitted data in TE polarization, using analog-to-digital converters 31, while the balance detectors 28 and 30 being used to recover a transmitted data in TM polarization, using analog-to-digital converters 31;

The balance photodector performance for quadrature hybrid is described in more details by the same team of inventors in the patent application U.S. Ser. No. 11/695,920 filed Apr. 3, 2007 and parent patents for that application, they are fully incorporated herein by reference.

In a preferable configuration, the described components of the Analyzer are formed as a part of a single planar chip, such as $LiNbO_3$ (LN) wafer, using a titanium in-diffused technology, with waveguides designed for single-mode TEM operation on an X-cut or Z-cut LN crystals, for example, together with crossing waveguide elements. Use of these elements provides a unique form factor that allows a monolithically integrated LN chip. The proposed Analyzer structure has a polarization insensitive functionality with an independent adjustment of each (modulated) polarization component of the signal. Both polarizations controllers (phase-shifters) utilize a respective voltage applied to a TE or TM respective electrodes.

Alternatively, the analyzer can be build on a substrate made of a material selected from ferroelectric or semiconductor or glass material, using in-diffused metal technology, protonic-exchange optical technology, etching/milling technology or similar.

In the preferred configuration, the InP array performs the conversion to the electrical band to derive I, Q signals for each polarization that are then electrically filtered and digitized by four high-speed A/D converters.

The Generalized Homodyne Receiver can operate at a high speed and can be combined with Star-QAM dual transmission.

The Generalized Homodyne Receiver requires no front-end optical filter and provides the selectivity for optical frequency selection as well as shot-noise limited detection. It is stabilized for every hop at a rate of up to 1 kHz to cope with the key-based optical frequency hopping that causes mismatch the interferometric mixing process at the hybrid.

Figure 5:
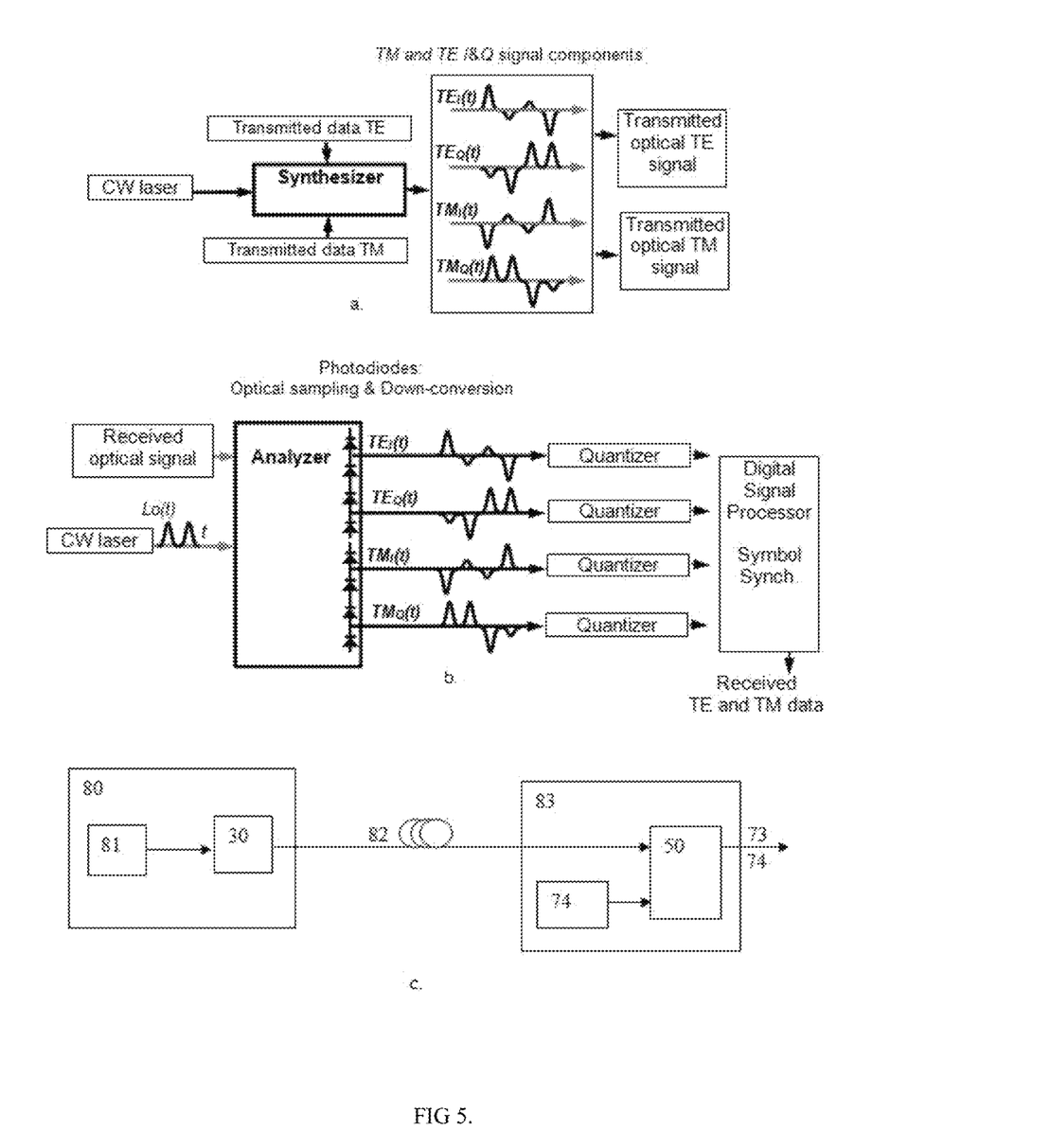
FIG. 5 shows schematic example of system architecture using (a) dual-polarization QAM Synthesizer, (b) dual-polarization QAM Analyzer; (c) a block diagram of the communication system, which implements the synthesizer and analyzer of the present invention.

In the Analyzer, a Mach Zehnder modulator may pulse the local oscillator laser output, see FIG. 5 (b) for single polarization. Within the receiver digital signal processor, a symbol synchronization algorithm insures that the local oscillator pulses are synchronized to the received optical signal. Thus, the balanced photodetectors serve as integrated coherent optical samplers and down-converters.

FIG. 5 shows schematic example of system architecture using (a) dual-polarization Star-QAM Synthesizer, (b) dual-polarization Star-QAM Analyzer; (c) a block diagram of the communication system, which implements the synthesizer and analyzer of the present invention.

The present disclosure provides an efficient way for dual-polarization Star-QAM communication, helping to improve an optical link capacity with advanced transmission characteristics, reliability and compactness.

The disclosed compact single-chip, fully adjustable, integrated devices have a number of advantages over multiple-chip or free space optics design. Single-chip integration provides the highest performance characteristics, improved reliability and compactness.

Such unique monolithic integration of complex functionality holds, in principle, an advantage in insertion losses, mechanical stability, ruggedness, size and manufacturing cost.

In the preferred embodiment, the devices are built on a single LN wafer using titanium in-diffused technology. The waveguides are designed for single-mode TE operation on X-cut, Y-propagation LN crystal. Y-junction reflectors and crossing waveguides are used to efficiently change the propagation direction in weakly-guided planar Ti-diffused LN structures. A combination of such techniques provides an effective integration capability. The innovative design of the Dual-Polarization Integrated LN Transmitter and Receiver Modules enables a significant reduction in the overall size of the chip, hence, assuring the 4" LN single die integration, for example.

Optoelectronic integrated circuits (OEICs) provide several advantages over their discrete and hybrid counterparts; among these are enhanced performance, ease of manufacture, and greater functionalities. Performance enhancement of OEIC receivers is provided by lower input capacitance and elimination of bond-wire inductance, which allows for higher operation speed and greater sensitivity. Manufacturing improvements accrue from the use of the photolithographically defined and monolithically produced combination of both detector and receiver, which eliminates labor-intensive packaging steps; at high speeds of 10 Gb/s and 40 Gb/s the benefits are even greater because of reduced packaging costs. Combination of greater functionality with the receiver element produces further gains. For example, photo detector (PD), transimpedance amplifier (TIA) and analog-to-digital converter (ADC) could be of considerable system advantage.

Such highly integrated Transmitter/Receiver Module will enable low manufacturing cost, mechanical stability, ruggedness, and high SNR in coherent optical system. The integration of various receiver components in a single LN chip dramatically reduces the cost, improves performance, and provides better stability and control to increase operational distance.

In various embodiments, the chip is a monolithic piece of a wafer that can be made of semiconductor or ferroelectric materials including but not limited to $LiNbO_3$, and the like. In various embodiments, different effects relative to the output of the chip of the present invention are possible, including but not limited to, (i) thermo-optical, (ii) electro-optical, (iii) electro-absorption, and the like can be utilized with the Optical Device. The electro-optical material, which can be LiNbO3, can be cut at X, Y, or Z planes. The electro-optical devices of the present invention can utilize a variety of different processes in its creation, including but not limited to, metal in-diffusion and/or (annealed) protonic-exchange technology, wet etching, reactive ion (beam) etching, plasma etching, and the like.

It is another object of the present invention to provide an optical communication system for data transmission using two polarization states of the light, which implements the disclosed Synthesizer and Analyzer. The block diagram of a coherent communications system according to the present invention is shown in FIG. 6(c). Optical transmitter 80 comprises a light source 81 and the synthesizer 30 that allows the data transmission in two polarization states of the light. Encoded optical signal is transmitted over the transmission link 82 to the optical receiver 83 where the data is decoded. The incoming beam is mixed in the analyzer 50 with the local oscillator beam from a local oscillator 84 and detected using a set of balanced photoreceivers. The output signals 75 carrying transmitted information can be displayed or used for further processing.

The application of the disclosed quadrature modulator is not limited to a free-space, fiber or waveguide optical communication. The present invention is related to any other possible applications of M-PSK modulation techniques.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An integrated transmitting synthesizer for optical communication, generating an optical signal modulated between multiple phase states and between different states of polarization, comprising:
    a Y-branch dividing the light beam from a light source and producing a first and a second transmitting beams; the first and the second transmitting beams entering a first M-PSK modulator and a second M-PSK modulator, respectively, and producing a first and a second PSK-modulated output beams; a first and a second polarization controllers receiving the first and the second output modulated beams, respectively, and creating a third and a fourth beams having polarization state orthogonal to each other; wherein the third and the fourth beams are modulated between multiple phase states and between different states of polarization and form an output of the synthesizer, wherein the first M-PSK-modulated beam is reflected from a first mirror prior to entering the first MZ modulator, and the second MPSK-modulated beam is reflected from a second mirror prior to entering the second MZ modulator, and wherein the first and the second mirrors located on the back output surface of a planar chip; the first MZ modulator producing the first QAM-beam and the second MZ modulator producing the second QAM-beam; the first QAM-beam is reflected from a third mirror prior to entering the polarization combiner, and the second QAM-beam is reflected from a fourth mirror prior to entering the polarization combiner, wherein the third and fourth mirrors located on the front surface of the planar chip, the first, the second, the third and the fourth mirrors providing compactness critical to the synthesizer formation on the single chip; the polarization combiner outputting a dual-polarization QAM signal.

2. The optical device of claim 1, wherein the Y-branch, the two M-PSK modulators, the first and a second polarization controllers, the two MZ modulators and the first, the second, the third and the fourth mirrors and the polarization combiner are formed as a part of a single planar chip.

3. The optical device of claim 1, wherein the chip is made of a material selected from ferroelectric or semiconductor material.

4. The optical device of claim 1, wherein a technology is used with an electro-optical material selected from in-diffused metal technology, protonic-exchange optical technology, etching optical technology or optical technology.

5. The optical device of claim 1, wherein the light source is a laser source producing a continuous light signal.

6. An integrated receiving apparatus for optical communication, receiving a transmitted optical signal modulated between multiple amplitude states, multiple phase states and between two states of polarization of the optical beam, comprising:
    a first waveguide receiving a first optical input beam; the first optical input beam being a first transmitted S optical beam modulated between multiple phase states and between different states of polarization;
    a second waveguide receiving a second optical input beam; the second Lo optical input beam being a Local Oscillator polarized at 45 degrees relatively to the TE and TM polarizations of the waveguide;
    a first splitter dividing the first optical input beam into a third and a fourth optical beams;
    a second splitter dividing the second optical input beam into a fifth and a sixth optical beams;
    a first phase-shifter, applied to the third optical beam; the first phase-shifter affecting the TE optical mode exclusively, within the third optical beam;
    a second phase-shifter, applied to the fourth optical beam; the second phase-shifter affecting the TM optical mode exclusively, within the fourth optical beam;
    a first 3 dB coupler, mixing the third optical beam and the fifth optical beam; the first 3 dB coupler, outputting a seventh and an eighth optical beams;
    a second 3 dB coupler, mixing the fourth optical beam and the sixth optical beam; the second 3 dB coupler, outputting a ninth and a tenth optical beams;
    a first polarization splitter; the first polarization splitter having the seventh optical beam as an input and producing a first output of TE polarization and a second output of TM polarization;
    a second polarization splitter; the second polarization splitter having the eighth optical beam as an input and producing a third output of TE polarization and a fourth output of TM polarization;
    a third polarization splitter; the third polarization splitter having the ninth optical beam as an input and producing a fifth output of TE polarization and a sixth output of TM polarization;
    a fourth polarization splitter; the fourth polarization splitter having the tenth optical beam as an input and producing a seventh output of TE polarization and an eighth output of TM polarization;

a first balance detector, detecting the first output of TE polarization and the third output of TE polarization;

a second balance detector, detecting the second output of TM polarization and the fourth output of TM polarization;

a third balance detector, detecting the fifth output of TE polarization and the seventh output of TE polarization;

a fourth balance detector, detecting the sixth output of TM polarization and the eighth output of TM polarization;

the first balance detector and the third balance detector being used to recover a transmitted data in TE polarization;

the second balance detector and the fourth balance detector being used to recover a transmitted data in TM polarization.

7. The apparatus of claim 6, wherein the first splitter, the second splitter, the first phaseshifter, the second phaseshifter, the first 3 dB coupler, the second 3 dB coupler, the first polarization splitter, the second polarization splitter, the third polarization splitter, the fourth polarization splitter, the first balance detector, the second balance detector, the third balance detector, the fourth balance detector are formed as a part of a single planar chip.

8. The apparatus of claim 6, wherein the chip is made of a material selected from ferroelectric or semiconductor or glass material.

9. The apparatus of claim 6, wherein a technology is used with the electro-optical material is selected from in-diffused metal technology, protonic-exchange optical technology, etching optical technology or milling technology.

10. An optical communication system for data transmission, comprising: a synthesizer transmitting an encoded optical beam to a receiver, the synthesizer comprising: Y-branch dividing the light beam from the light source and producing a first and a second transmitting beams; the first and the second transmitting beams entering a first M-PSK modulator and a second M-PSK modulator producing a first and a second PSK-modulated output beams; a first and a second polarization controllers receiving the first and the second output modulated beams, respectively, and creating a third and a fourth beams having polarization state orthogonal to each other; the first PSK-modulated beam is reflected from a first mirror prior to entering the first MZ modulator, and the second PSK-modulated beam is reflected from a second mirror prior to entering the second MZ modulator, wherein the first and the second mirrors located on the back output surface of a planar chip; the first MZ modulator producing the first QAM-beam and the second MZ modulator producing the second QAM-beam; the first QAM-beam is reflected from a third mirror prior to entering the polarization combiner, and the second QAM-beam is reflected from a fourth mirror prior to entering the polarization combiner, wherein the third and fourth mirrors located on the front surface of the planar chip, the first, the second, the third and the fourth mirrors providing compactness critical to the synthesizer formation on the single chip; the polarization combiner outputting a dual-polarization QAM signal; the synthesizer formed as a part of a single planar chip.

11. The optical communication system of claim 10, wherein the receiver is a coherent optical analyzer comprising:

a first waveguide receiving a first optical input beam; the first optical input beam being the first transmitted S optical beam modulated between multiple phase states and between different states of polarization;

a second waveguide receiving a second Lo optical input beam; the second Lo optical input beam being a Local Oscillator polarized at 45 degrees relatively to the TE and TM polarizations of the waveguide;

a first splitter dividing the first optical input beam into a third and a fourth optical beams;

a second splitter dividing the second optical input beam into a fifth and a sixth optical beams;

a first phase-shifter, applied to the third optical beam; the first phase-shifter affecting the TE optical mode exclusively, within the third optical beam;

a second phase-shifter, applied to the fourth optical beam; the second phase-shifter affecting the TM optical mode exclusively, within the fourth optical beam;

a first 3 dB coupler, mixing the third optical beam and the fifth optical beam; the first 3 dB coupler, outputting a seventh and a eighth optical beams;

a second 3 dB coupler, mixing the fourth optical beam and the sixth optical beam; the second 3 dB coupler, outputting a ninth and a tenth optical beams;

a first polarization splitter; the first polarization splitter having seventh optical beam as an input and producing a first output of TE polarization and a second output of TM polarization;

a second polarization splitter; the second polarization splitter having eighth optical beam as an input and producing a third output of TE polarization and a fourth output of TM polarization;

a third polarization splitter; the third polarization splitter having ninth optical beam as an input and producing a fifth output of TE polarization and a sixth output of TM polarization;

a fourth polarization splitter; the fourth polarization splitter having tenth optical beam as an input and producing a seventh output of TE polarization and a eighth output of TM polarization;

a first balance detector, detecting the first output of TE polarization and the third output of TE polarization;

a second balance detector, detecting the second output of TM polarization and the fourth output of TM polarization;

a third balance detector, detecting the fifth output of TE polarization and the seventh output of TE polarization;

a fourth balance detector, detecting the sixth output of TM polarization and the eighth output of TM polarization;

the first balance detector and the third balance detector being used to recover a transmitted data in TE polarization;

the second balance detector and the fourth balance detector being used to recover a transmitted data in TM polarization; wherein the analyzer formed as a part of a single planar chip.

12. The optical communication system of claim 11, wherein the data transmission is performed in fiber.

13. The optical communication system of claim 11, wherein the data transmission is performed in free space or between satellites.

14. The optical communication system of claim 11, wherein the data is transmitted using dual-polarization star-QAM modulation format.

15. The optical communication system of claim 11, wherein the data rate is at least 40 Gb/s.

16. The optical communication system of claim 11, wherein the data transmission is in long haul communications system more than 1000 km long.

17. The optical communication system of claim 11, wherein the data transmission is in metropolitan area.

* * * * *